US006267938B1

(12) United States Patent
Warrender et al.

(10) Patent No.: US 6,267,938 B1
(45) Date of Patent: Jul. 31, 2001

(54) SCAVENGERS FOR USE IN REDUCING SULFIDE IMPURITIES

(75) Inventors: Neil Andrew Warrender; John Cossar, both of Calgary (CA)

(73) Assignee: Stanchem, Inc., Etobicoke (CA)

( * ) Notice: Subject to any disclaimer, the term of this patent is extended or adjusted under 35 U.S.C. 154(b) by 0 days.

(21) Appl. No.: 08/743,120

(22) Filed: Nov. 4, 1996

(51) Int. Cl.$^7$ ................. C10G 29/20; C10L 3/10
(52) U.S. Cl. .............. 423/226; 423/228; 48/127.5; 208/208 R; 208/237; 208/238
(58) Field of Search ................. 423/226, 228, 423/229, 242.2; 208/208 R, 237, 238; 48/127.5

(56) References Cited

U.S. PATENT DOCUMENTS

| 4,978,512 | 12/1990 | Dillon | 423/226 |
|---|---|---|---|
| 5,128,049 | * 7/1992 | Gatlin | 423/226 |
| 5,314,672 | * 5/1994 | Vasil | 423/226 |
| 5,347,003 | * 9/1994 | Trauffer et al. | 423/228 |
| 5,354,453 | * 10/1994 | Bhatia | 208/236 |
| 5,405,591 | 4/1995 | Galloway | 423/228 |
| 5,462,721 | 10/1995 | Pounds et al. | 423/226 |
| 5,488,103 | * 1/1996 | Gatlin | 564/483 |
| 5,674,377 | * 10/1997 | Sullivan et al. | 208/236 |
| 5,688,478 | * 11/1997 | Pounds et al. | 423/228 |
| 5,980,845 | * 11/1999 | Cherry | 423/229 |

FOREIGN PATENT DOCUMENTS

| 167770 | * 1/1986 | (EP) . | |
|---|---|---|---|
| 0 411 745 A1 | 2/1991 | (EP) | C10L/1/22 |
| 2130568 | 6/1984 | (GB) | C02F/11/18 |
| WO 90/07467 | 7/1990 | (WO) | C01B/17/04 |
| WO 94/08980 | 4/1994 | (WO) | C07D/251/04 |

* cited by examiner

*Primary Examiner*—Steven P. Griffin
*Assistant Examiner*—Timothy C. Vanoy
(74) *Attorney, Agent, or Firm*—Caesar, Rivise, Bernstein, Cohen & Pokotilow, Ltd.

(57) ABSTRACT

A method is provided for reducing the amount of hydrogen sulfide and organic sulfides present in streams, such as natural gas streams, by scrubbing the stream with a composition containing (i) an aqueous phase containing a reaction product resulting from the reaction between an aldehyde, such as formaldehyde, and a first amine, such as monoethanolamine or aminoethylpiperazine, and (ii) an organic phase containing at least a second amine, such as butylamine, pentylamine or hexylamine, to produce: (1) a stream having a diminished amount of sulfide contaminants and (2) a sulfided reaction product, such as trithiane. The sulfided reaction product is solubilized into the organic phase (which precludes the formation of solids), and this resulting sulfided reaction product-containing organic phase is separated from the aqueous phase. The sulfided reaction product-containing organic phase may be used as a corrosion inhibitor, and the composition has reduced foaming characteristics during the scrubbing step.

12 Claims, 6 Drawing Sheets

SCAVENGERS FOR USE IN REDUCING SULFIDE IMPURITIES

FIELD OF THE INVENTION

This invention features a method and composition for sweetening fluid streams. In particular, this invention relates to a method and composition for reducing the amount of hydrogen sulfide and organic sulfides in such streams, particularly natural gas streams.

BACKGROUND OF THE INVENTION

Natural gas is a mixture of hydrocarbons and non-hydrocarbon gases found in geologic formations beneath the earth's surface, often in association with petroleum. As obtained from the ground, raw gas contains a number of impurities which must be removed at some point. The principal impurities in natural gas are water, carbon dioxide, hydrogen sulfide, organic sulfides and condensable hydrocarbons, such as propane, butane and pentane.

Generally speaking, hydrogen sulfide and organic sulfides (collectively here "sulfides"), because of their corrosiveness and toxicity, are removed in the field prior to introduction to a pipeline for transport to a market or off-site processing plant. The maximum level of hydrogen sulfide, "$H_2S$", the primary sulfide impurity of natural gas, permitted to be introduced into a pipeline is often limited to 0.25 grains per 100 cubic feet of gas, that is, 4 parts per million (ppm), although in some instances, up to 1 grain per 100 cubic feet (16 ppm) is acceptable.

$H_2S$, like hydrocarbon components of natural gas, exists in the gaseous state at normal temperatures and pressures. There is a variety of approaches to removing $H_2S$ from, or at least substantially reducing the amount of $H_2S$ in natural gas, i.e., "sweetening" natural gas. One general approach is to expose the raw natural gas to a treatment liquid containing an agent which chemically reacts with $H_2S$, a so-called $H_2S$ scavenger. Usually, the natural gas is bubbled through the liquid and as the bubbles rise through the liquid, $H_2S$ comes into contact with the agent to react and form a non-gaseous, or relatively non-volatile, product. The $H_2S$ thus becomes trapped in the liquid and is removed from the gas.

One type of agent often used to react with $H_2S$ is the reaction product of an organic amine compound having an "active hydrogen" and an aldehyde. An active hydrogen herein is a hydrogen directly bonded to a nitrogen atom. It is this type of scavenging or trapping agent to which the present invention relates. Examples of such agents are described in U.S. Pat. No. 4,978,512 (issued Dec. 18, 1990 to Dillon) and U.S. Pat. No. 5,462,721 (issued Oct. 31, 1995 to Pounds et al.). The specifications of both of these earlier patents are incorporated herein by reference.

As described by Pounds et al., there is a number of characteristics that are considered desirable in treatments containing such active agents. Generally speaking, it is desirable that the agent be highly reactive, i.e., the $H_2S$ (or organic sulfides) should react readily with the agent as the $H_2S$ passes through the treatment liquid. At the same time, it is desirable that the agent remain effective even in the presence of a large excess of $CO_2$, that is, it should be selective. The scavenging agent should be easy to handle, that is, be of appropriate viscosity, have a suitable pour point and low toxicity—it should have no free formaldehyde nor produce a vapor containing formaldehyde. In terms of performance, it is also desirable that the agent not foam excessively in use.

It is also desirable for the reaction product(s) of the $H_2S$ and the scavenging agent to have certain characteristics. It has generally been the approach to use single phase treatments. In particular, liquid treatments in which the products of the $H_2S$ trapping reaction are soluble in the liquid have thus been considered highly desirable because of the ease of disposal of the spent fluids.

SUMMARY OF THE INVENTION

The present invention, in one broad aspect, is a method for reducing the level of sulfide impurities present in a fluid stream. The method includes contacting the stream with a composition comprising the reaction product of an aldehyde and a aminoethylpiperazine (AEP) and a second aliphatic amine $NHR_1R_2$, wherein $R_1$ or $R_2$ can be hydrogen and wherein $R_1$ and $R_2$ contain a total of from 1 to about 6 carbons, for a period of time sufficient to reduce the level of the impurities in the stream.

According to particular embodiments of the invention, described below, the invention is a scavenger which separates into two liquid phases. Such separation may occur as the active agent of the scavenger reacts with sulfides such as $H_2S$ or organic sulfide(s) of a stream being treated. Usually the stream being treated contains hydrocarbon, and is typically an oil or gas stream, usually a natural gas stream. It is also possible for a scavenger composition to include two liquid phases prior to reaction with impurities of the stream.

As the active ingredient of a scavenger composition of the present invention generally includes a water soluble phase, the invention includes a method for reducing levels of sulfide(s) in an aqueous system, say, for example, sewage.

An advantage of the presence of two immiscible liquids, aside from the avoidance of solids formation, which is usually undesirable, is that the two liquids i.e., liquid phases can be readily separated from each other. According to a particular embodiment of the invention, described below, it is thus possible to isolate one phase, containing amine which is produced during reaction of the scavenger and react the amine with an aldehyde to produce more scavenger which can then be used to treat the stream. The other phase, containing spent scavenger, i.e., sulfided components, can be used as an anti-corrosion agent.

The performance of the embodiments of the invention subjected to testing, as described below, was found to be relatively unaffected by the presence of $CO_2$, and hence scavenger compositions of the present invention are generally "selective".

Generally speaking, the second amine, as described above, of a scavenger of the present invention is also referred to as an "enhancing amine". The enhancing amine, $NHR_1R_2$, can be non-cyclic. $R_1$ can be hydrogen while $R_2$ is an aliphatic hydrocarbon group having between 1 and about 6 carbons.

An aldehyde from which a composition of the present invention is derived can be a monoaldehyde, is usually an aliphatic aldehyde, and usually has between 1 and 4 carbon atoms. The aldehyde of the preferred embodiment is formaldehyde.

Generally speaking, in the oil and gas industry, it is unacceptable to have unreacted formaldehyde present in a scavenger composition to any significant degree. For this reason, when formaldehyde is the aldehyde from which a scavenger composition is derived, the total amine content is sufficient to react with all of the formaldehyde.

On a molar basis, the aldehyde:AEP ratio is between about 1.0:1.6 and about 10:1 and is more preferably between 1:1 and 5:1 or 2:1 and 4:1. An even more preferred the ratio is between about 2.5:1 and 4.5:1, and most preferably, it is about 3:1.

In terms of the enhancing amine, the amount selected can depend upon the advantages of the invention that are desired. That is, it is possible for a person skilled in the art to modify the tested formulations of the invention to obtain scavenger compositions which vary somewhat in their properties and still remain within the scope of the invention. It is possible to vary proportions and retain to varying degrees at least one of the advantages of the present invention: formation of a biphasic liquid as the scavenger composition reacts; a biphasic composition prior to reaction with a sulfide-containing stream; avoidance of solid(s) formation; reduced foaming during the scavenging operation.

Generally, the ratio of AEP:enhancing amine, again on a molar basis, is between about 10:1 and 1:5, but more typically between 5:1 and 1:3, or even 4:1 and 1:2. More preferably still, the ratio is between 2:1 and 1:2 or between about 1:1 and 1:1.5. In a particular embodiment, described below, the molar ratio is 1:1.4 and in another, it is 1:1.

According to a method of the invention, there is sufficient amine present to provide between about 1.5 and 3 equivalents of an active hydrogen for every equivalent of aldehyde carbonyl group. According to particularly preferred embodiments, combined amounts of aminoethylpiperazine and $NHR_1R_2$ provide between about 1.5 and 3 equivalents of an active hydrogen for every equivalent of aldehyde carbonyl group. More preferably, the combined amounts of aminoethylpiperazine and $NHR_1R_2$ provide about 2 equivalents of active hydrogen for said equivalent of carbonyl group.

The enhancing amine of the scavenger can be a primary amine with a straight chain alkyl group and/or it can be present in an amount sufficient to reduce foaming over that which would be observed in its absence, and/or to it can be present in an amount sufficient to substantially preclude solid(s) formation and/or it can be present in an amount sufficient to ensure the presence of two immiscible liquid phases in spent scavenger solution.

The invention includes a method for reducing the level of sulfide impurities present in a stream of gas, or liquid, or a mixture thereof, which includes contacting the stream with a composition comprising a solution having an aqueous first liquid phase containing a water soluble reaction product of an aldehyde and first amine which reacts with the impurities to form one or more hydrophobic reaction products, and a hydrophobic component which forms a second liquid phase so as to solubilize the hydrophobic reaction products to preclude the formation of solids thereby, the composition being contacted with the stream for a period of time sufficient to reduce the level of the impurities therein.

According to the present invention, the enhancing amine can, along with the first amine, react with the aldehyde(s) present in formation of the scavenger, i.e., the second amine of the composition can also be at least partially reacted with the aldehyde.

The first amine can be monoethanolamine.

The first amine can be, as it is with the previously described aspect, aminoethylpiperazine.

A scavenging method of the present invention can include first and second phases (immiscible liquid phases) prior to contact with the stream.

The reaction product of the second amine with the aldehyde(s) can be part of the scavenging composition and the second phase can form during the reaction of the impurities with the composition.

In another aspect, the present invention is a method for reducing the level of sulfide impurities present in a stream of gas, or liquid, or a mixture thereof, including steps of:

(a) contacting the stream with a composition comprising a solution having at least a first liquid phase which is aqueous and contains a water soluble reaction product of an aldehyde and first amine which reacts with the impurities to form one or more sulfur-containing hydrophobic reaction products, and a hydrophobic component which forms a second liquid phase so as to solubilize the sulfur-containing hydrophobic reaction products to preclude the formation of solids thereby, the composition being contacted with the stream for a period of time sufficient to reduce the level of the impurities therein;

(b) isolating at least a portion of the second liquid phase containing solubilized sulfur-containing reaction products; and (c) employing the isolated portion as a corrosion inhibitor.

In such a method, the hydrophobic component can include an aliphatic second amine $NHR_1R_2$, wherein one of $R_1$ and $R_2$ can be hydrogen and wherein $R_1$ and $R_2$ contain a total of from 1 to about 6 carbon atoms. $R_1$ can be hydrogen and $R_2$ can be an aliphatic hydrocarbon group having between 1 and about 6 carbon atoms.

According to the method, it is possible to select the second amine and choose sufficient hydrocarbon component such that the first and second phases are formed prior to the contacting step.

The aldehyde can be a monoaldehyde and it can be formaldehyde.

The first amine can be aminoethylpiperazine.

Employing the isolated portion as a corrosion inhibitor can include adding the portion to the interior of a pipeline exposed to an aqueous liquid. Contents of the pipeline might include hydrocarbon and/or $CO_2$ and/or $SO_2$ and/or $H_2S$.

Such a method can also include:

(d) isolating at least a portion of the first liquid phase; and (e) reacting the amine of the isolated phase with an aldehyde so as to form additional water soluble reaction product.

It can further include:

(f) contacting the stream with the additional water soluble reaction product to react with the impurities as part of step (a), thereby recycling the amine component of the composition.

Further, steps (b), through (f) can be repeated.

According to another aspect, the invention is a method for reducing the level of sulfide impurities present in a stream of gas, or liquid, or mixture thereof, comprising the steps of:

(A) contacting the stream with a composition comprising a solution having at least a first liquid phase which is aqueous and contains a water soluble reaction product of an aldehyde and first amine which reacts with the impurities to form one or more hydrophobic reaction products, and a hydrophobic component which forms a second liquid phase so as to solubilize sulfur-aldehyde-containing hydrophobic reaction products formed during the contacting step to preclude the formation of solids, the composition being contacted with the stream for a period of time sufficient to reduce the level of the impurities therein, wherein the amine is water soluble and at least a portion of the amine is regenerated upon reaction of the reaction product with the impurities and retained in the first liquid phase;

(B) isolating at least a portion of the first liquid phase; and (C) reacting the amine of the isolated phase with an aldehyde so as to form additional water soluble reaction product.

In such a method, the hydrophobic component can include an aliphatic second amine, $NHR_1R_2$, wherein one of $R_1$ and $R_2$ can be hydrogen and wherein $R_1$ and $R_2$ contain a total of from 1 to about 6 carbon atoms. $R_1$ can be hydrogen and $R_2$ can be an aliphatic hydrocarbon group having between 1 and about 6 carbon atoms. As with other embodiments, it is also possible for the second amine to be selected and sufficient hydrocarbon component chosen to be present prior to the contacting step such that the first and second phases are formed prior to the contacting step.

The aldehyde can be a monoaldehyde and it can be formaldehyde.

The first amine can be aminoethylpiperazine.

The method can further include:

(D) contacting the stream with the additional water soluble reaction product to react with the impurities as part of step (A), thereby recycling the amine component of the composition.

The method can included repetition of steps (B), through (D).

The method can be such that step (C) includes isolating at least a portion of the second liquid phase containing the sulfur-containing reaction products, and employing the isolated portion as a corrosion inhibitor.

In another aspect, the invention is a scavenger composition for $H_2S$ and/or organic sulfides comprising the reaction product of an aldehyde and aminoethylpiperazine and a second aliphatic amine $NHR_1R_2$, wherein $R_1$ or $R_2$ can be hydrogen and wherein $R_1$ and $R_2$ contain a total of from 1 to about 6 carbons, for a period of time sufficient to reduce the level of the impurities in the stream.

The second amine of the composition can be non-cyclic.

$R_1$ can be hydrogen and $R_2$ can be an aliphatic hydrocarbon group having between 1 and about 6 carbons.

The aldehyde can be a monoaldehyde, the aldehyde can be aliphatic, the aldehyde can have between 1 and 4 carbon atoms. The preferred aldehyde is formaldehyde.

The amounts of aldehyde and $NHR_1R_2$ can be present in relative amounts sufficient provide between about 1.5 and 3 equivalents of H bonded directly to the N of $NHR_1R_2$ for every equivalent of carbonyl groups in the aldehyde. Alternatively, the amounts of aldehyde and $NHR_1R_2$ provide about 2 equivalents of H bonded directly to the N of $NHR_1R_2$ for every equivalent of carbonyl groups in the aldehyde.

Another aspect of the present invention involves the observation that activity of aldehyde-amine sulfide trapping agents is increased in the presence of water. A preferred method for reducing the levels of sulfide impurities thus includes adding water to the composition, i.e., the amine-aldehyde reaction product. The amount of water added to the composition can yield a ratio of water/reaction product of between about 1:10 and about 10:1 by weight, or between about 2:9 to about 9:2 by weight, or between about 3:8 to about 8:3 by weight, or between about 4:7 and about 7:4 by weight, or between about 5:6 and about 6:5 by weight or about 1:1 by weight.

In another aspect, a scavenger of the present invention is a composition comprising a solution having an aqueous first liquid phase containing a water soluble reaction product of an aldehyde and first amine for reaction with sulfide impurities to form one or more hydrophobic reaction products, and a second amine which forms a second liquid phase so as to solubilize at least a portion of the hydrophobic reaction products formed upon reaction of the sulfide impurities and the water soluble reaction product of an aldehyde and first amine so as to preclude the formation of solids thereby.

The aldehyde can be a monoaldehyde and it can be an aliphatic aldehyde having between 1 and about 4 carbon atoms. The second amine can have the formula $NH_2R$, wherein R is an aliphatic hydrocarbon group having between 1 and about 6 carbons. The second amine of the composition can also be at least partially reacted with the aldehyde.

The first amine can be monoethanolamine.

The first amine can be aminoethylpiperazine.

BRIEF DESCRIPTION OF THE DRAWINGS

The invention is described in greater detail below, with reference to the attached drawings in which.

DESCRIPTION OF PREFERRED EMBODIMENTS

In one particular aspect, the present invention involves contacting a stream of raw gas with a composition that includes the reaction product of an aldehyde and aminoethyl-piperazine and an enhancing amine belonging to the family $NH_2R$, wherein R is an aliphatic hydrocarbon group having between 1 and about 6 carbons, for a period of time sufficient to reduce the level of the impurities in the stream.

Scavenger compositions containing reaction products of aminoethylpiperazine and particular members of the family of enhancing amines have the advantage of not forming solids or precipitating out of solution, even when the scavenger solution is spent. Enhancing amines in which R is methyl, ethyl, propyl, butyl, pentyl or hexyl have been observed in the lab, see below, to confer this property on scavenger compositions. Any one of these amines could be used to obtain the advantage, or a mixture of two or more of the amines might be used. It must be borne in mind, that it is necessary to use an appropriate amount of enhancing amine(s) in combination with other components of a scavenger composition to obtain the desired result. Examples of suitable amounts are given below, but a person skilled in the art is capable of using other amounts while obtaining the desired result.

Scavenger compositions obtained using one of a subgroup of the preceding enhancing amines, i.e., butyl, pentyl and hexyl, have been found to have the property that a second liquid phase develops as the scavenger reaction proceeds. Actual compositions having this advantage are described below. Such a property would be considered an advantage under particular circumstances, which are described more fully below.

Scavenger compositions containing reaction products involving aminoethyl-piperazine and particular members of the family of enhancing amines have the advantage of reduced foaming characteristics. Enhancing amines in which R is propyl, butyl, pentyl and hexyl have been observed in the lab to confer this property on scavenger compositions.

Before proceeding further with a description of the present invention, it must be said that "enhancing" amines have been suggested by others for use as a component of $H_2S$ scavenging compositions. Pounds et al. found certain enhancing amines to be useful in inhibiting gel formation which can occur when an aldehyde and polyamine are mixed together. Pounds et al. describe families of etheramines and alkanolamines that may be used with polyamines to inhibit such gel formation, polyamines including organic amines having a plurality of amine groups with two or more of the following: a primary amine group, a secondary amine group, or a tertiary amine group. The enhancing amines were described by Pounds et al. as being effective in reducing gelling problems with polyamines including aminoethylpiperazine, polyoxyalkyleneamines and alkylenepolyamines. As a general rule, when using a polyamine as a reactant to form a sulfide scavenger, i.e., trapping agent, the polyamine should not be combined with the aldehyde prior to the enhancing amine, as is described more thoroughly by Pounds et al. In experiments described herein, where a composition contains more than one amine, a mixture of the amines was added to a stirred mixture of formaldehyde and any solvents indicated.

In any case, there is no suggestion by Pounds et al. of using the enhancing amines of the invention described herein for any purpose.

In another aspect, the present invention involves contacting a hydrocarbon stream with a composition that includes a solution having an aqueous liquid phase containing a water soluble reaction product of an aldehyde and first amine which reacts with sulfide impurities in the stream to form one or more hydrophobic reaction products. One such product, for example, would be trithiane formed from a monoaldehyde such as formaldehyde and $H_2S$. The makeup of the scavenger composition is such that hydrophobic sulfur-containing reaction products, for example, trithiane, are solubilized and do not precipitate as solids from the scavenger solution. A particular example of such a composition is one in which AEP is the first amine and n-butyl amine is used in sufficient concentration as an enhancing amine.

Another aspect of the present invention involves the observation that activity of aldehyde-amine sulfide trapping agents is increased in the presence of increasingly polar liquids. Of the liquids tested, the highest activity is obtained in the presence of water.

It was generally found that the performance of the scavengers of the present invention was unaffected by the concentration of $CO_2$ in the gas stream.

Figure 1:
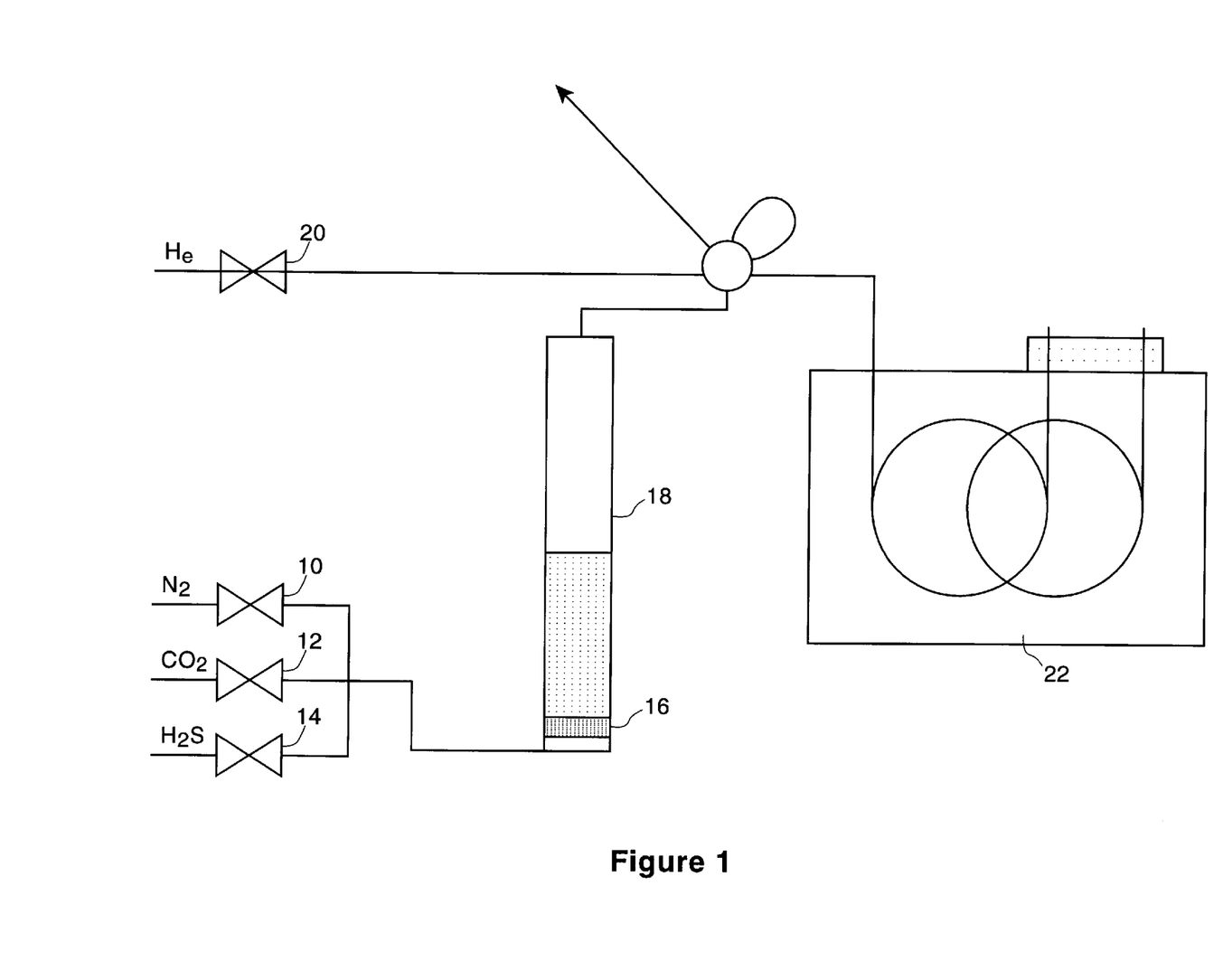
FIG. 1 is a schematic diagram of an apparatus used in laboratory scale experiments to test effectiveness of $H_2S$ scavengers.

Laboratory scale results described herein were obtained using the apparatus shown schematically in FIG. 1. Mass flow controllers 10, 12, 14 were used to control the inflow of $N_2$, $CO_2$, $H_2S$, respectively. Gas flow is through the controllers through glass frit 16 located at the bottom of test column 18. The test column was about 60 cm in height with an inner diameter of about 0.9 cm. Helium, admitted through controller 20, was the carrier gas for samples admitted for analysis to gas chromatograph 22. The gas chromatograph permits measurements of levels of $H_2S$ and $CO_2$ to be monitored (thermal conductivity detector) in ppm from samples collected at selected intervals.

In laboratory experiments, the gas fed into the apparatus was typically 5% $CO_2$, 0.5 to 1% $H_2S$, with the balance being nitrogen, and the flow rate set to obtain a gas residence time in the solution of about 5.4 seconds, unless otherwise stated. The $H_2S$ levels used were higher than those expected to be found in field use, in order to shorten the length of the experiments.

In experiments where the degree of foaming was evaluated, an unsatisfactory degree of foaming was deemed to occur if the height of the foam became equal to or greater than the height of the liquid column for more than half of the time of the experiment. In some experiments, foam spilled out of the top of the column, causing problems which were resolved by adding an antifoaming agent such as a long chain alcohol or silicone polymer. In this way, the test could be completed and the efficacy of the test solution in capturing $H_2S$ could be measured.

In one early set of experiments, solutions containing reaction products of different AEP:formaldehyde ratios were tested. The results are given in Table 1.

TABLE 1

Breakthrough time of $H_2S$ in various formaldehyde-aminoethylpiperazine solutions compared to a formaldehyde-ethanolamine solution.

| Formaldehyde:AEP | Solution Composition | | Breakthrough Time (minutes) |
|---|---|---|---|
| 2.0:1 | Formalin | 30.0% | 150 |
| | AEP | 23.9% | |
| | Water | 36.0% | |
| | Isopropanol | 10.1% | |
| 2.2:1 | Formalin | 30.0% | 120 |
| | AEP | 21.7% | |
| | Water | 32.2% | |
| | Isopropanol | 16.1% | |
| 2.5:1 | Formalin | 30.0% | 150 |
| | AEP | 19.1% | |
| | Water | 38.0% | |
| | Isopropanol | 12.9% | |
| 3.0:1 | Formalin | 30.0% | 150 |
| | AEP | 15.7% | |
| | Water | 40.0% | |
| | Isopropanol | 14.3% | |
| Not applicable | Formalin | 30.0% | 90 |
| | MEA | 22.8% | |
| | Water | 34.4% | |
| | Methanol | 12.8% | |

The breakthrough times obtained (greater than 250 ppm H$_2$S slippage in exit gas) indicate that the performance of the active ingredient of these compositions compares favorably with the reaction product of MEA and formaldehyde (Dillon et al.). However, the reaction product of AEP and formaldehyde had an unsatisfactory level of foaming when in use, and there was appreciable solids formation in the spent material. An otherwise comparable solution having a formaldehyde:AEP ratio of 1.67:1 was found to form a gel, and was not tested for scavenging effect.

AEP and formaldehyde were reacted in several experiments using various enhancing amines. In this case the testing apparatus was loaded with 5.0 g of test material and with 6.0 g of water. In some cases the two liquids were partially immiscible, that is, two phases formed prior to the test. The height of the liquid column was 15 to 16 cm, about one quarter the column height of 60 cm. The test gas (94% N$_2$, 5% CO$_2$, 1% H$_2$S) was fed through the scavenger at a rate of 200 ml/min. Samples of the eluted (sweetened) gas were taken every 8 minutes and the H$_2$S concentration determined by a gas chromatograph, with the H$_2$S concentration in the challenge gas (10,000 ppm) being used as the standard. The gas residence time was about 3.3 seconds. In all cases, the molar ratio of formaldehyde:AEP:enhancing amine was 3:1:1. The formaldehyde concentration was kept constant at 30% (of 37% aqueous formaldehyde). See Table 2.

TABLE 2

Summary of sweetener solution behavior, piperazine-formaldehyde, and various enhancing amines scavenger combinations

| Enhancing Amine | 2 Phases (Y/N) (prior to expt) | Solids (Y/N) (at 24 hr) | Foam Problems(*) | Approximate Time Taken (±4 min) for Slippage of H$_2$S to exceed 250 ppm |
| --- | --- | --- | --- | --- |
| Butylamine | Y | N | N | 68 min |
| Hexylamine | Y | N | N | 44 min |
| Pentylamine | Y | N | N | 60 min |
| Propylamine | N | N | N | 76 min |
| Ethylamine | N | N | Y+ | 92 min |
| Methylamine | N | N | Y+ | 68 min |
| Cyclohexyl-amine | Y | Y | Y+ | 60 min |
| Benzylamine | Y | Y | Y+ | 44 min |
| Aminoethyl-piperidine | N | Y | Y+ | 52 min |
| Aminoethyl-morpholine | N | Y | Y+ | 68 min |
| Aminoethoxy-ethanol | N | Y | Y+ | 60 min |
| Monoethanol-amine | N | Y | Y++ | 70 min |
| None | N | Y | Y+ | 76 min |
| None | N | Y | Y++ | 76 min |
| None | N | Y | Y+ | 84 min |

(*)"Y" (yes) describes an experiment where the height of the foam was equal to or greater than the height of the liquid column (without gas) for more than half of the time of the experiment. "Y+" described an experiment where an antifoam agent was needed to keep the liquid from spilling out of the top of the tower. "Y++" indicates that an experiment was aborted early due to foaming problems.

As can be seen, there was no solids formation prior to H$_2$S breakthrough for any of the scavengers produced using enhancing amines that are part of the present invention. This is in contrast to the result obtained under similar conditions in which aminoethoxyethanol is the enhancing amine.

In the case of each of propyl-, butyl-, pentyl- and hexylamine, foaming problems were not observed. In the case of each of butyl-, pentyl- and hexylamine, two liquid phases were observed to form as the scavenger reaction proceeded.

It can thus be seen that it is possible to obtain three advantages of the present invention in a single scavenger composition using as an enhancing amine butyl, pentyl- or hexylamine. Of course, mixtures of these amines can also be used as an enhancing amine. In other words, using one or more of these amines, it is possible to obtain a scavenger composition with (i) reduced foaming characteristics, in which (ii) solids formation does not occur prior to the scavenger being spent, and in which (iii) two liquid phases form as the H$_2$S trapping reaction proceeds.

A complete analysis of the separate liquid phases which formed has not been performed, but it is known that two phases are formed when the aliphatic R chain of the enhancing amine is relatively long. It is thus believed that a first phase of the biphasic system is a relatively hydrophilic phase and contains water and mostly other relatively polar solution constituents. This would be termed the "aqueous" phase. The other second phase contains mostly relatively hydrophobic or non-polar constituents, i.e., a portion of the enhancing amine (although this will vary depending upon the hydrophobicity of the particular enhancing amine(s) present) and trithiane reaction product. The formation of two phases would generally be considered advantageous because this would make it possible, at least under some circumstances, to remove the phase containing the sulfided reaction product (for example, trithiane). For example, once the scavenger has been "spent", the charge could be pumped from the contactor or bubble tower, to a holding tank. In the absence of agitation caused by the gas flow, the scavenger will settle into two immiscible liquid phases. The sulfur-rich organic (relatively hydrophobic) phase can then be separated from the aqueous layer, which would generally have a greater volume. Feasibility studies, to determine if sufficient partitioning of sulfided products into the hydrophobic phase were carried out and are described below.

Figure 2:
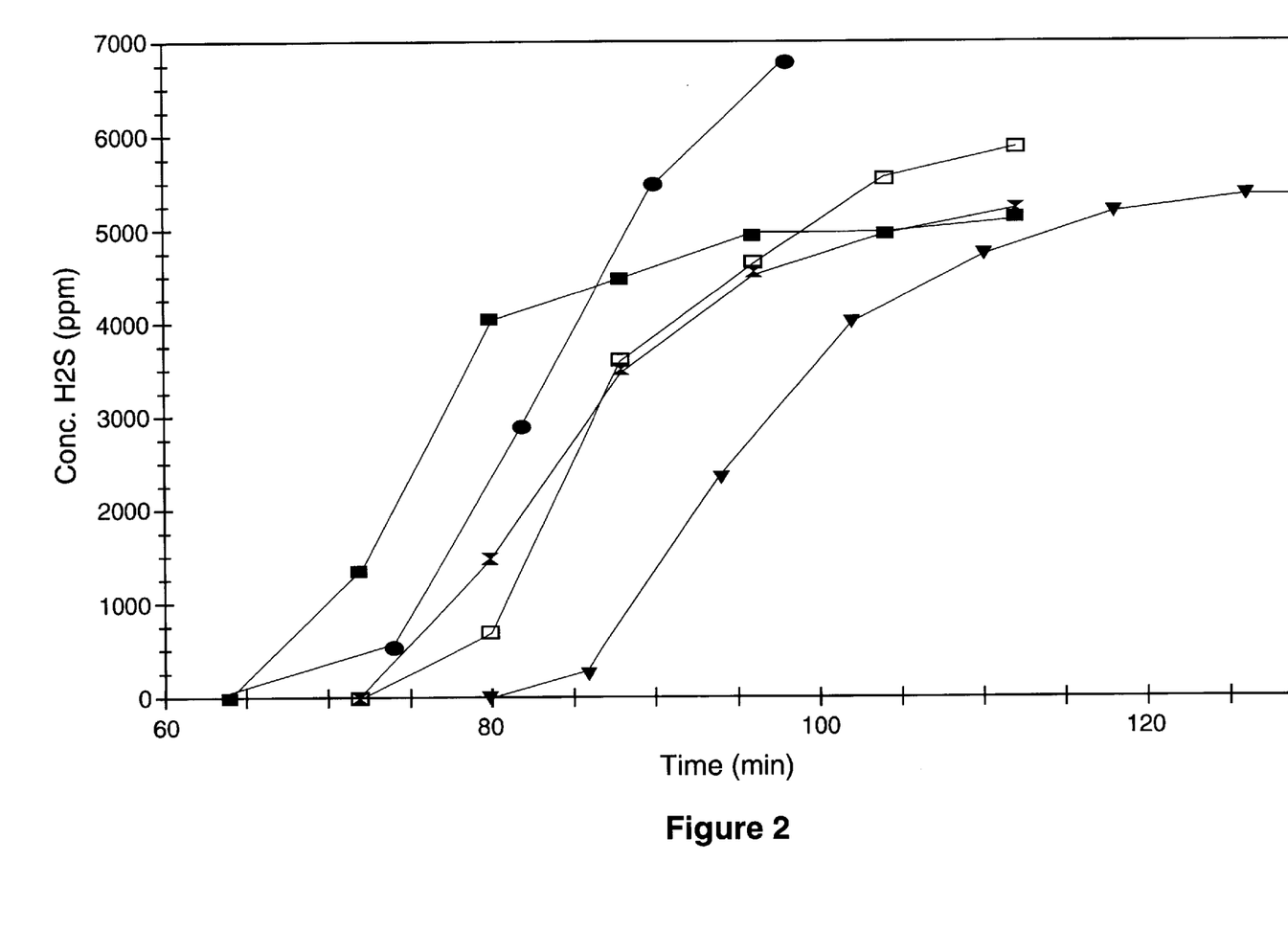
FIG. 2 shows the concentration of $H_2S$ slipping through a test treatment solution as a function of time for different enhancing amines. The residence time for the gas was 2.2 seconds. With the exception of Composition "D", the scavenging agent was the reaction product of aminoethylpiperazine and formaldehyde and for each of these the enhancing amine was an equimolar amount of the amine indicated: Composition "C" (n-butylamine (BA) (▼); monoethanolamine (MEA) (□); aminoethylethanolamine (AEEA) X̄; and methoxypropylamine (●); and Composition "D" (■) (first listed composition in Table 3).

Experiments were performed to compare different enhancing amines: butylamine; monoethanolamine; aminoethanolamine; and methoxypropylamine. Scavenger solutions were thus prepared from formaldehyde, aminoethylpiperazine and each of the different enhancing amines. In one experiment, the scavenging agent was the reaction product of monoethanolamine and formaldehyde with no second amine present. The residence time of the gas being passed through the treatment solution was about 2.2 seconds.

The results of these experiments are shown in FIG. 2. As can be seen, the time taken for a given amount of H$_2$S to break through the treatment fluid was greater where n-butylamine is the enhancing amine than in all other cases.

Figure 3:
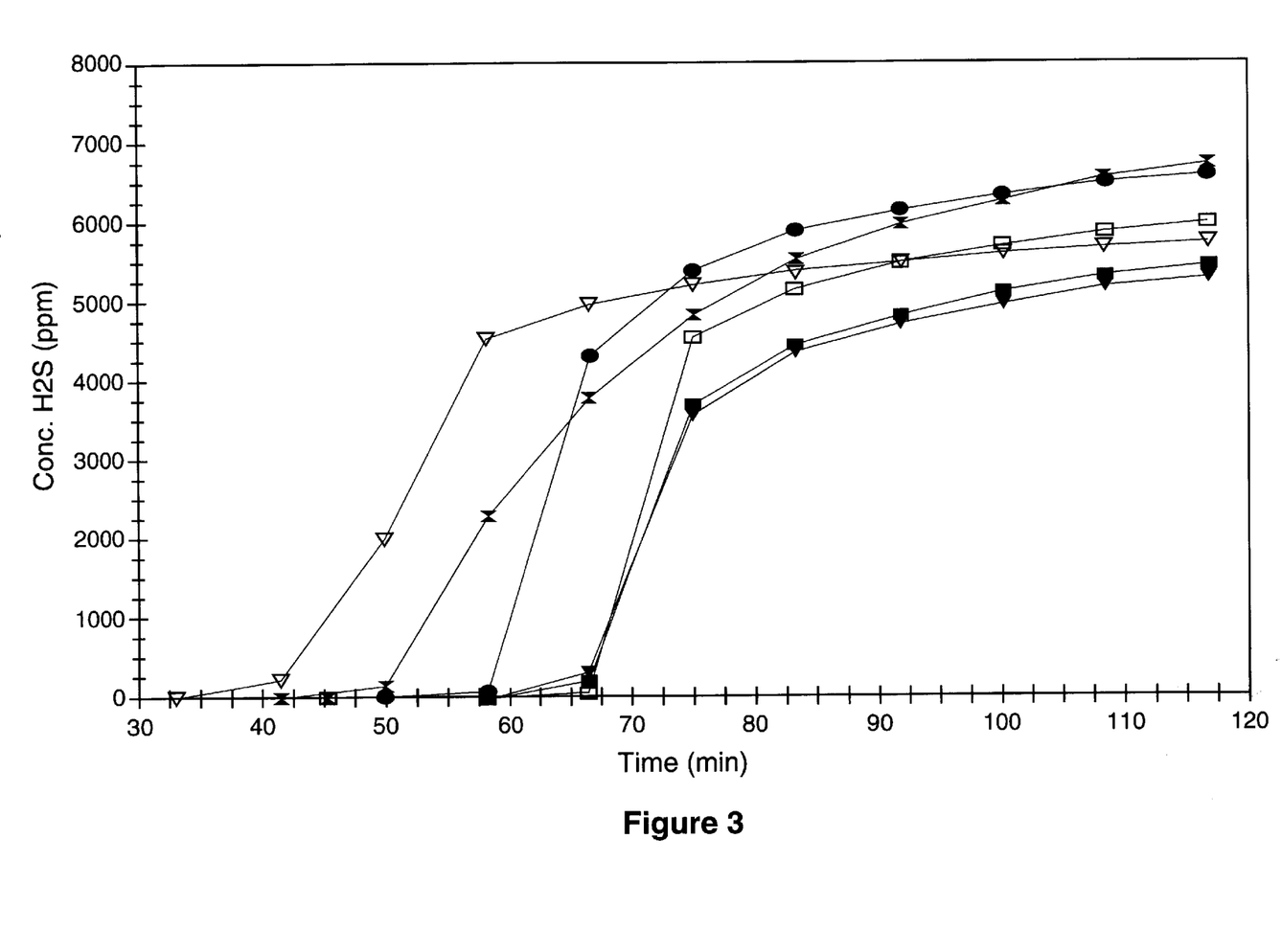
FIG. 3 shows the concentration of $H_2S$ (ppm) slipping through a test treatment solution as a function of time (minutes) for different enhancing amines in the presence of the reaction product of formaldehyde and monoethanolamine: hexylamine (∇); pentylamine X̄; n-butylamine (BA) (●); propylamine (■); ethylamine (▼); no enhancing amine (□). Detailed compositions of the scavenging solutions are given in Table 3.

In another series of tests, various enhancing amines were tested with the reaction product of formaldehyde and MEA as scavenger. The test column of the apparatus was charged with 5 gm of each composition and 6 ml of water. In this case, the inner diameter of the column was about 1.5 cm. The gas flow rate was 300 ml/min to give a residence time of about 2.2 seconds. The initial H$_2$S concentration in the gas was 6700 ppm, being monitored by gas chromatography, as previously described. Results are given in Table 3 and FIG. 3.

TABLE 3

Summary of sweetener behavior, ethanolamine-formaldehyde, and various enhancing amines

| Blend (Amine) | Number Of Phases | | | | Break Through Time (Min.) | Foam Height | |
|---|---|---|---|---|---|---|---|
| | Initial | Spent | After 3 days | After 7 days | | Initial | Final |
| 30.0% Formaldehyde<br>22.5% Ethanolamine<br>30.0% Isopropanol<br>17.5% Water | One | One | Two<br>(1 solid) | Two<br>(1 solid) | 58–66 | 6 in. | 8 in. |
| 30.0% Formaldehyde<br>15.0% Ethanolamine<br>9.3% Butylamine<br>30.00% Isopropanol<br>15.7% Water | Two | Two | Two | Two | 50–58 | 2 in. | 3 in. |
| 30.0% Formaldehyde<br>15.0% Ethanolamine<br>7.5% Propylamine<br>30.0% Isopropanol<br>17.5% Water | One | Two | Two | Two | 66–75 | 6 in. | 2 in. |
| 30.0% Formaldehyde<br>15.0% Ethanolamine<br>8.2% Ethylamine<br>(70% aq. solution)<br>30.0% Isopropanol<br>16.8% Water | One | Two | Two | Two | 58–66 | 2 in. | 2 in. |
| 30.0% Formaldehyde<br>15.0% Ethanolamine<br>11.1% Pentylamine<br>30.0% Isopropanol<br>13.9% Water | Two | Two | Two | Two | 42–50 | none | none |
| 30.0% Formaldehyde<br>15.0% Ethanolamine<br>12.9% Hexylamine<br>30.0% Isopropanol<br>12.1% Water | Two | Two | Two | Two | 33–42 | none | none |

As can be seen from Table 3, solids formation was avoided for all enhancing amines used. Two liquid phases were present in the spent material in all cases. Two liquid phases were also present initially in the case of butyl-, pentyl- and hexylamines, those with the largest R-groups.

Butylamine was tested further with the reaction product of formaldehyde and AEP as scavenger. Experiments were thus carried out to determine the effect of butylamine concentration on foaming behavior, the molar ratio of formaldehyde:AEP:butylamine being varied from the preferred ratios of 3:1:1. The column was charged with a mixture of 5 grams of the scavenger blend and 6 ml of water. Two phases were present at the beginning of the test for those blends which had a molar ratio of BA:AEP of 1 or greater. The results are summarized in Table 4.

TABLE 4

Summary of sweetener solution behavior.
Aminoethylpiperazine-butylamine-formaldehyde reaction products made with various AEP-BA ratios.

| Mole Ratio BA/AEP | Solids (Y/N) | Foam Problems (*) | Phases (**) |
|---|---|---|---|
| 0 | Y | Y++ | 1 |
| 1/9.5 | Y | Y | 1 |
| 1/4.5 | Y | N | 1 |
| 1/2.6 | N | Y | 2 |
| 1/1.5 | N | N | 2 |
| 1/1.0 | N | N | 2 |
| 2/1.0 | N | N | 2 |
| 3/1.0 | N | N | 2 |

(*) See Table 2.
(**) Phase behavior at the end of the test is indicated. "2" indicates two liquid phases.

As can be seen from the third column of Table 2 and the last two columns of Table 3, foaming problems can be reduced through the use of enhancing amines of the present invention. The results shown in the third column of Table 4 show that foaming is reduced as the concentration of the enhancing amine, n-butylamine increases.

Solids formation was not observed when a sufficient amount of an enhancing amine of the present invention was used. The results shown in the second column of Table 4 indicate that solids formation is eliminated in the presence of sufficient n-butylamine as the enhancing amine. This is apparently due to the formation of a second liquid phase which solubilizes the sulfided reaction product that is normally insoluble in the aqueous scavenger solution. As biphasic (two liquid phases) behavior can be induced by the addition of water to a stock scavenger solution of the present invention, foaming problems can also be reduced by the addition of water.

One particular formulation, Composition "A", tested in the lab and in field trials had the following composition:

| | |
|---|---|
| Water | 12.5% |
| IPA | 5.5% |
| Butyl Cellosolve ™ (2-Butoxyethanol) | 20.0% |
| Ethylene glycol | 5.6% |
| 2-ethylhexanol | 0.3% |
| MIBC (methylisobutyl carbinol) | 1.9% |
| Formalin (37% formaldehyde) | 30.0% |
| AEP | 15.9% |
| Butylamine | 8.3% |

Ethylene glycol, an optional ingredient, is a carrier having a high boiling point, which is therefore relatively resistant to evaporation. In the field trial, natural gas flow was 0.33MSCFD (million standard cubic feet per day) and it contained 20 ppm of $H_2S$. Sufficient of the foregoing formulation diluted by half with water was used in the field trial to obtain a gas residence time of 2 seconds. The solution was replenished to its initial volume of 220 liters at day 14. Results obtained are given in FIG. 4. An upset, unrelated to the use of the scavenger, occurred at the plant on day 18 and the trial had to be stopped at that point.

A second formulation, Composition "B", was found in laboratory scale experiments to have a breakthrough time about one third longer than that given above, the second formulation having the following composition:

| | |
|---|---|
| Water | 15.5% |
| IPA | 6.5% |
| Butyl Cellosolve | 20.5% |
| 2-ethylhexanol | 0.3% |
| Oleyl alcohol | 0.05% |
| Formalin (37% formaldehyde) | 32.9% |
| AEP | 16.45% |
| Butylamine | 7.8% |

(Density @ 20° C. = 0.993)

Figure 4:
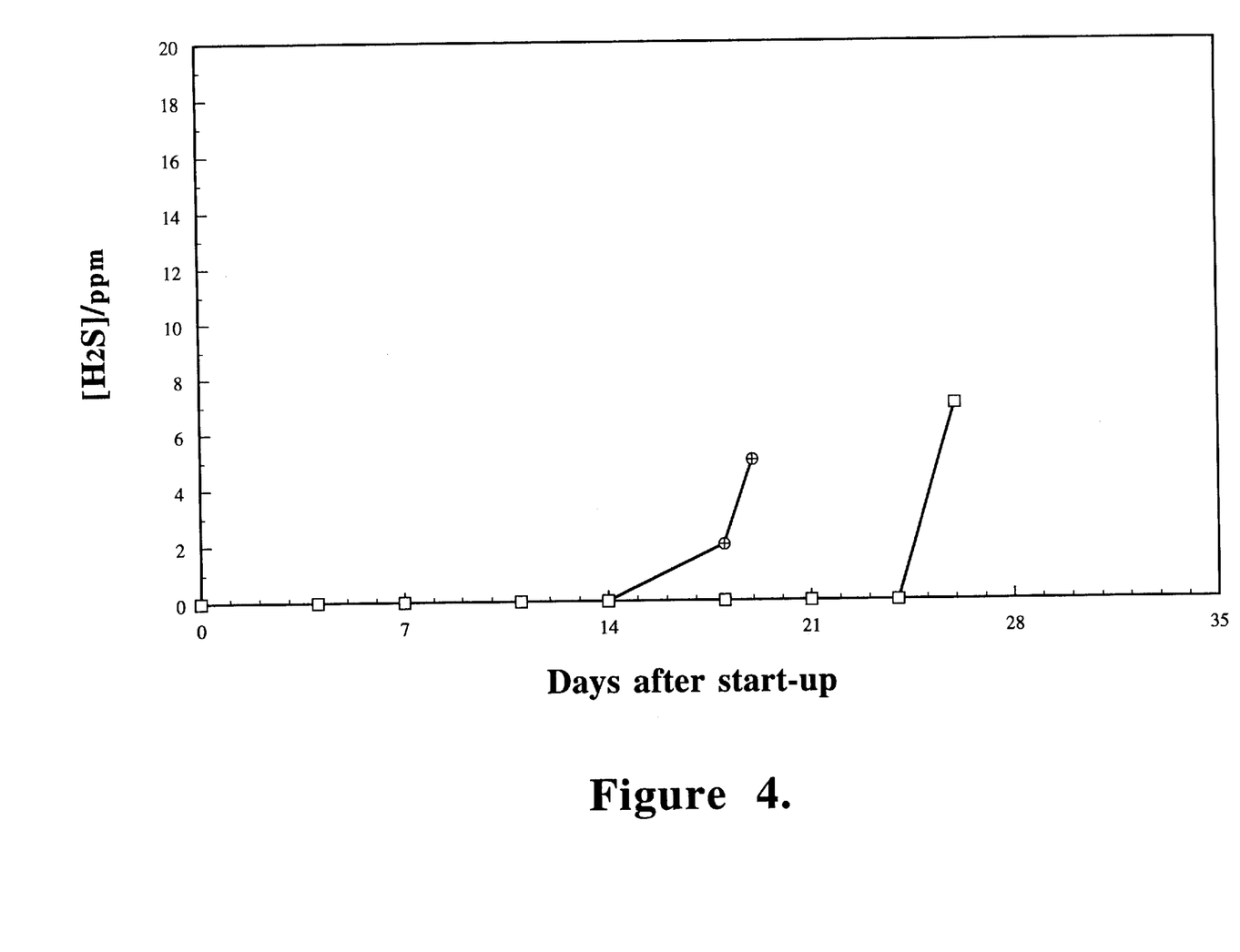
FIG. 4 shows the concentration of $H_2S$ slippage as a function of time (days) in field trials of Composition "A" (○) and Composition "B" (□). In the case of Composition "A", 110 liters of scavenger solution were used; for Composition "B", 150 liters were used.

Results of a field trial of Composition B, under the same conditions as those for Composition A are also shown in FIG. 4.

Figure 5:
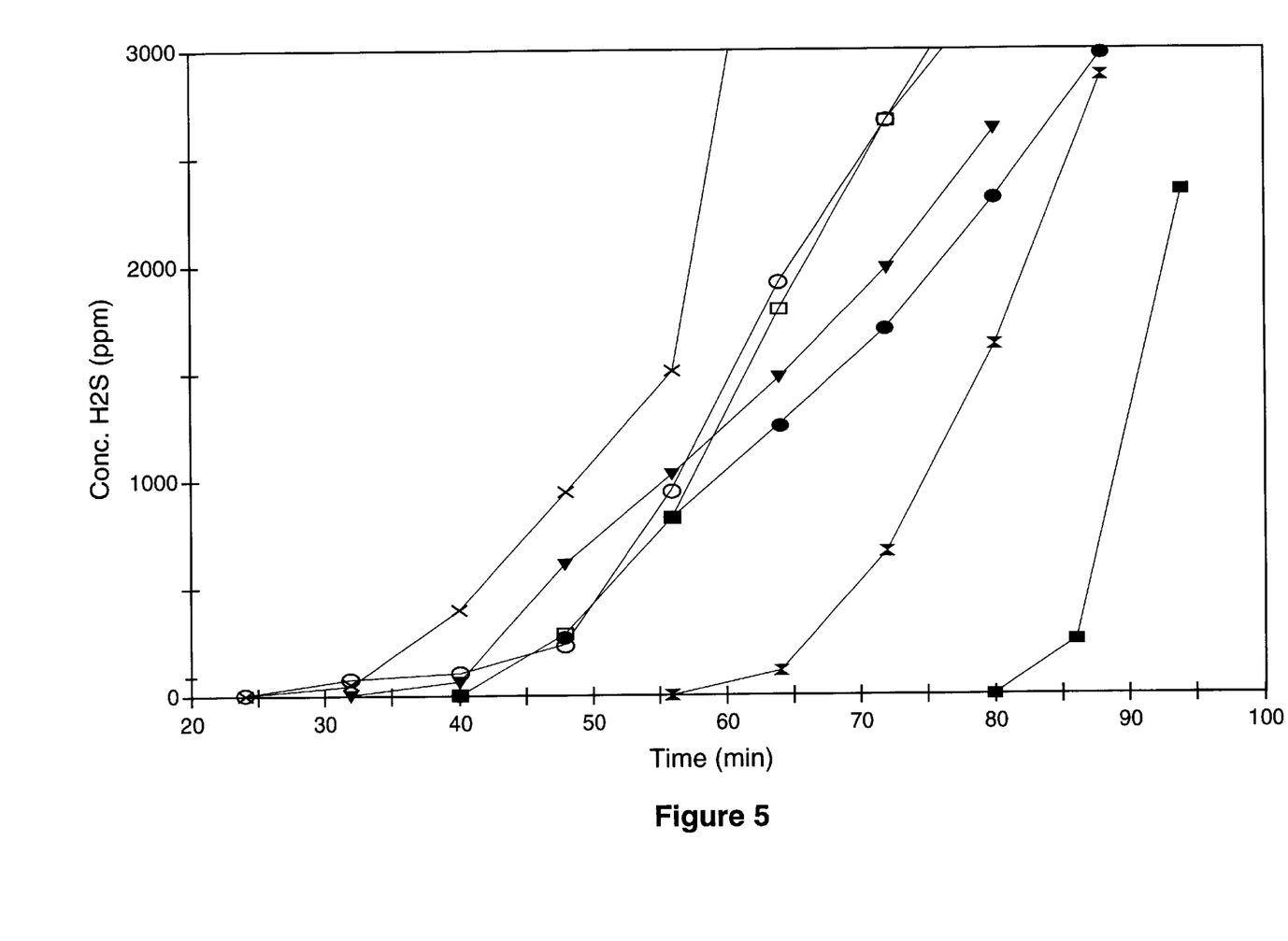
FIG. 5 shows the concentration of $H_2S$ (ppm) slipping through test treatment solutions as a function of time (min), the solutions containing solvents of various polarities: $H_2O$ (■); methanol X̄; propanol (●); ethyl acetate (□); butanol (▼); pentanol (○); and triethylamine (×). The residence time for the gas was about 2.2 seconds.

Experiments were performed to determine the effect of polarity of the treatment liquid medium. A test column (1.5 cm diameter) was loaded with 5 grams of a scavenger solution (30.0% formaldehyde; 30.0% IPA; 14.5% water; 9.3% butylamine; and 16.2% AEP), 1 ml of water, and 5 ml of the selected solvent. The gas flow rate was about 300 ml/min, with an $H_2S$ flow rate of 2 ml/min, the balance being 5% $CO_2$ and 95% nitrogen. The $H_2S$ concentration was 6700 ppm and residence time of the gas about 2.2 seconds. Results are summarized in FIG. 5 which shows slippage of $H_2S$ as a function of time for various solvents. As can be seen, significantly less slippage occurred when water was included in the treatment solution than for any other of the solvents.

As indicated above, a useful treatment formulation can have two liquid phases prior to reaction of the scavenger with sulfide. It has also been observed for particular formulations, that formation of the second liquid phase occurs as the trapping reaction proceeds, or it can occur merely upon addition of water. In a commercial environment, it is often desirable for a formulation to be supplied to an end user in a convenient form. In the case of the present invention, it may be desirable to provide a formulation in a relatively concentrated single phase form to which the user would be instructed to add an appropriate amount of water.

Another unexpected result has been found in that spent reaction products of scavengers of the present invention are useful as corrosion inhibitors. Laboratory tests described below were carried out with a brine having the following composition:

| | |
|---|---|
| $MgSO_4.7H_2O$ | 1.41 g liter$^{-1}$ |
| $MgCl_2.6H_2O$ | 4.69 g liter$^{-1}$ |
| $CaCl_2.2H_2O$ | 4.70 g liter$^{-1}$ |
| $NaHCO_3$ | 6.43 g liter$^{-1}$ |
| NaCl | 86.89 g liter$^{-1}$ |

Corrosion rates can be assessed in the laboratory through the use of mild steel test coupons exposed to the corrosive conditions over a period of time. The data which follow were obtained in tests in which coupons had been fashioned from a 6" wide, 0.008" thick roll of shimstock (carbon steel) by cutting it into strips approximately ½" wide.

A suitable volume of brine, having the composition given above, was purged for four hours with a pre-blended mixture of 10% $H_2S$ and 90% $CO_2$. Each spent scavenger solution to be tested was added, at the concentration indicated, to a 350 ml glass bottle, together with 100 ml of brine and a pre-weighed shimstock test coupon. The headspace in each bottle was purged with the $H_2S/CO_2$ gas mixture to remove oxygen. The bottles were sealed and spun at 16 rpm for 7 days at 60° C., after which period the coupons were reclaimed, cleaned by immersion in inhibited hydrochloric acid, xylene and methanol, and then re-weighed.

"Percent protection", or "% P" value was calculated using weight loss from a blank experiment (i.e. one in which no chemical inhibitor was added to the brine), according to the following equation:

$$\% P = \frac{\text{Weight loss from "blank" coupon} - \text{weight loss from "test" coupon}}{\text{Weight loss from "blank" coupon}} \times 100\%$$

Spent material obtained from three scavenger formulations were tested for corrosion inhibition properties: Composition "B" (which was exhausted in a field trial), Composition "C" and a formaldehyde-ethanolamine blend whose composition is given in the first row of Table 3. The latter two scavengers were saturated with $H_2S$ in the laboratory.

| Composition "C": | |
|---|---|
| Water | 14.5% |
| IPA | 30.0% |
| Formalin | 30.0% |
| AEP | 16.2% |
| Butylamine | 9.3% |

Figure 6:
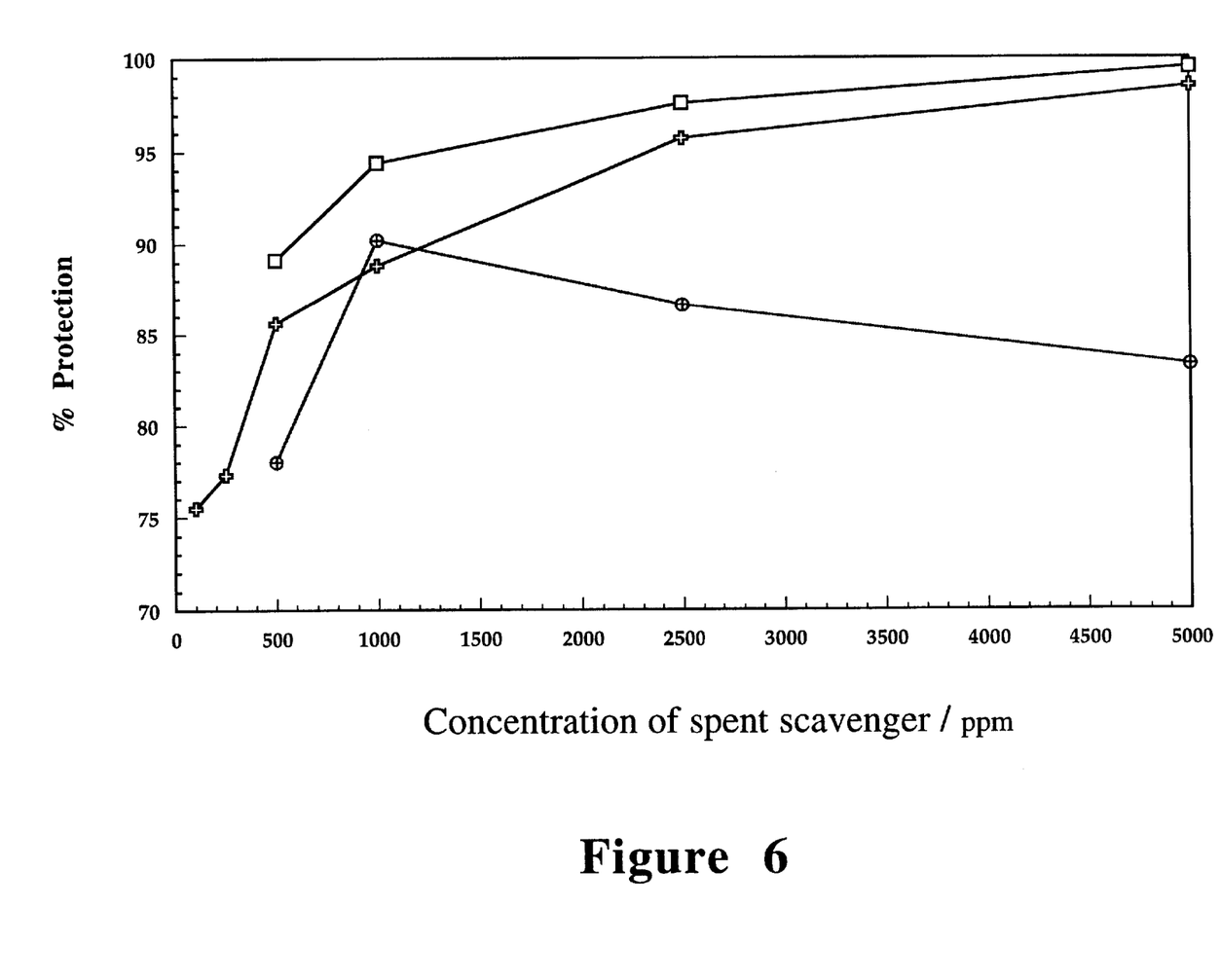
FIG. 6 is a plot of % protection against concentration of spent scavenger (ppm): Composition "C" (□, spent in lab trial); Composition "B" (✚, spent in field trial); and composition described in last line of Table 1 (⊕, spent in lab trial).

The results of the corrosion testing of these three "spent" scavengers are shown in FIG. 6.

A further aspect of the present invention is thus the use of a spent scavenger as a corrosion inhibitor. In practice there are several ways in which this advantage can be realized. For, example, once the chemical in the contact tower is spent, it can be simply discharged to the sour water disposal system, where it will inhibit corrosion of the water flow line as it passes to deep well disposal. Alternatively, the scavenger charge can be pumped to a holding or settling vessel where the two liquid phases are allowed to separate. The lower volume "sulfur-rich" organic layer can then be drawn off and injected or batched into sour flow-lines to inhibit corrosion therein. In this way it will act as a water dispersible inhibitor of acid gas corrosion.

As mentioned above, feasibility studies were carried out to determine if sulfided product is sufficiently partitioned into the hydrophobic layer. A solution of 5 g of Composition "A" and 6 g of water was loaded into a bubble tower (1.5 cm diameter). 6000 ppm of $H_2S$ was bubbled through the solution for a period of time sufficient to ensure that the solution was past the point of $H_2S$ breakthrough. The spent sample was turbid immediately after saturation was complete. For the purposes of analysis, in order to effect a clean separation, the solution was centrifuged, heated and collected in a separatory funnel. Samples of the organic and aqueous phases were analyzed on an Antek Sulpher Analyzer.

The wt % of sulphur in the organic phase was found to be about 6.4%, while that in the aqueous phase was found to be 0.75%. These results indicate that it is feasible to formulate a scavenger composition, which when spent, can form two separable immiscble liquid phases, one of which can be used as a corrosion inhibitor and the other of which contains recyclable amine.

The aqueous layer, which contains amine(s) released from the scavenger as the scavenger reacts with sulfides, can be retained and reconstituted into an active scavenger through the addition of formaldehyde. Additional enhancing amines can be added, as appropriate to reconstitute the composition for use as a scavenger. In this way, amine can be recycled.

What is claimed is:

1. A method for reducing the level of sulfide impurities present in a stream of gas, or liquid, or a mixture thereof comprising contacting the stream with a composition comprising (i) a reaction product formed from the reaction between an aldehyde and a first amine, and (ii) a second amine selected from the group consisting of butylamine, pentylamine, hexylamine and mixtures thereof wherein the amount of said second amine present in said composition is sufficient to solubilize the sulfided reaction product resulting from said contacting thereby precluding the formation of solids and wherein the contact time is sufficient to reduce the level of the impurities in the stream.

2. The method claim 1 wherein the aldehyde is a monoaldehyde.

3. The method of claim 2 wherein the monoaldehyde is an aliphatic aldehyde having between 1 and about 4 carbon atoms.

4. The method of claim 2 wherein the second amine of the composition is also at least partially reacted with the aldehyde.

5. The method of claim 2 wherein the first amine monoethanolamine.

6. The method of claim 2 wherein the first amine is aminoethylpiperazine.

7. The method of claim 2 wherein the composition includes said first and second phases prior to contact with the stream.

8. The method of claim 1 wherein the second amine is butylamine.

9. The method of claim 8 wherein the first amine is aminoethylpiperazine.

10. The method of claim 1 wherein said stream is a hydrocarbon-containing stream.

11. The method of claim 1 wherein said sulfide impurities comprise $H_2S$.

12. A method for reducing the level of sulfide impurities present in a hydrocarbon-containing stream of gas, or liquid, or a mixture thereof in which the formation of solids in the stream is precluded, the method comprising contacting the stream with a composition comprising (i) a reaction product formed from the reaction between formaldehyde and aminoethylpiperazine, and (ii) butylamine such that the molar ratio of the butylamine to the aminoethylpiperazine is at least ⅓, for a period of time sufficient to reduce the level of the impurities in the stream.

* * * * *